> United States Patent Office 3,490,689
Patented Jan. 20, 1970

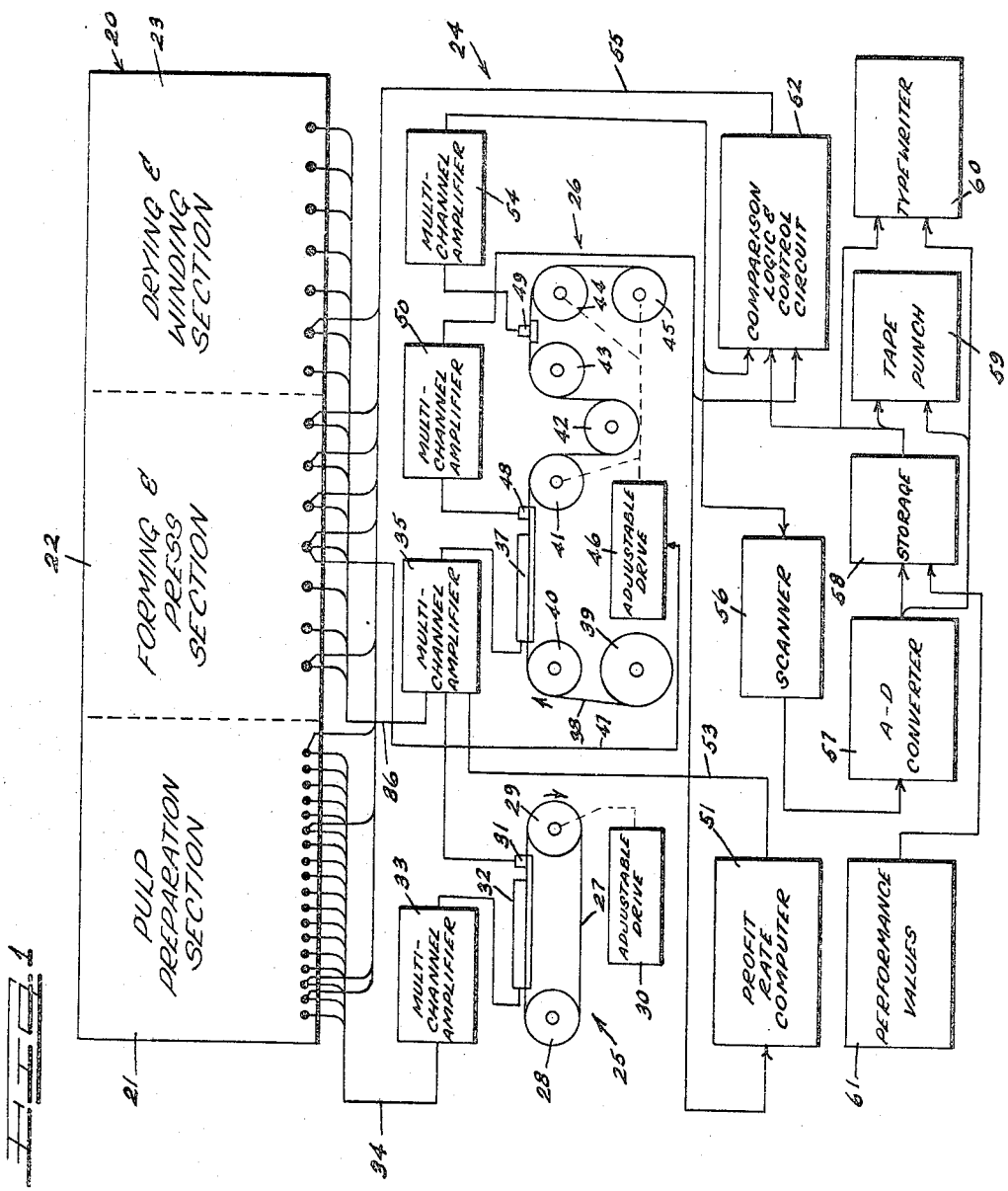

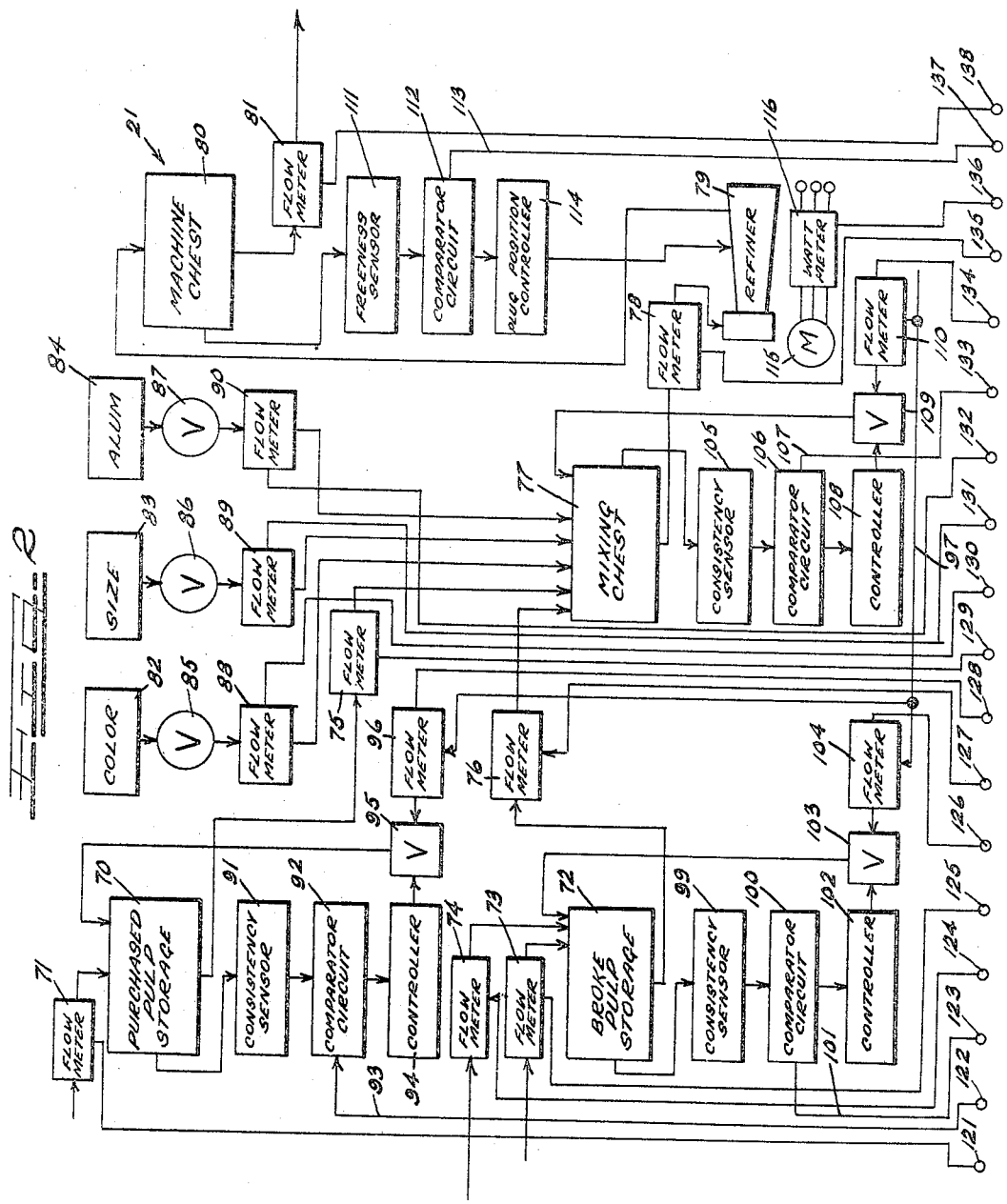

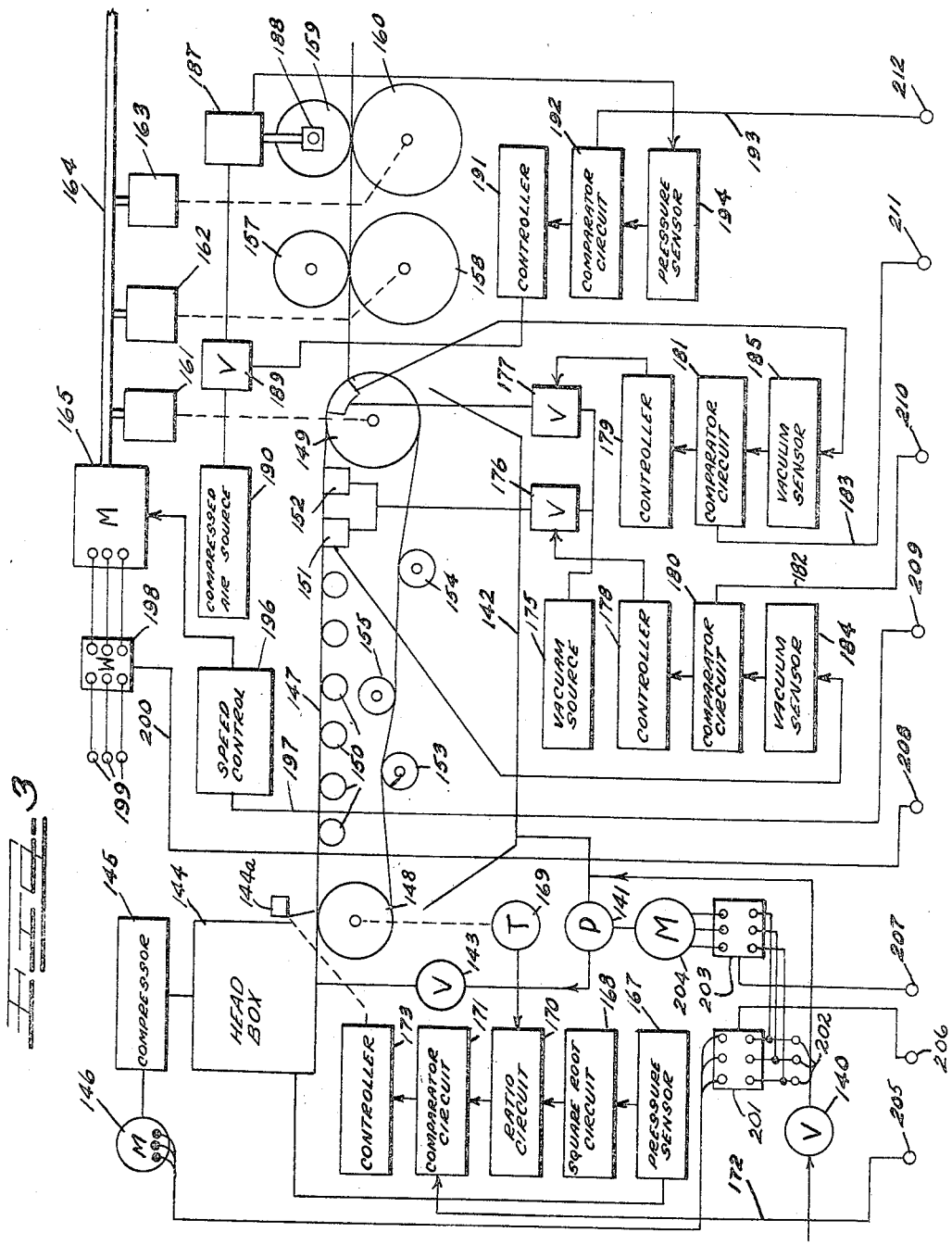

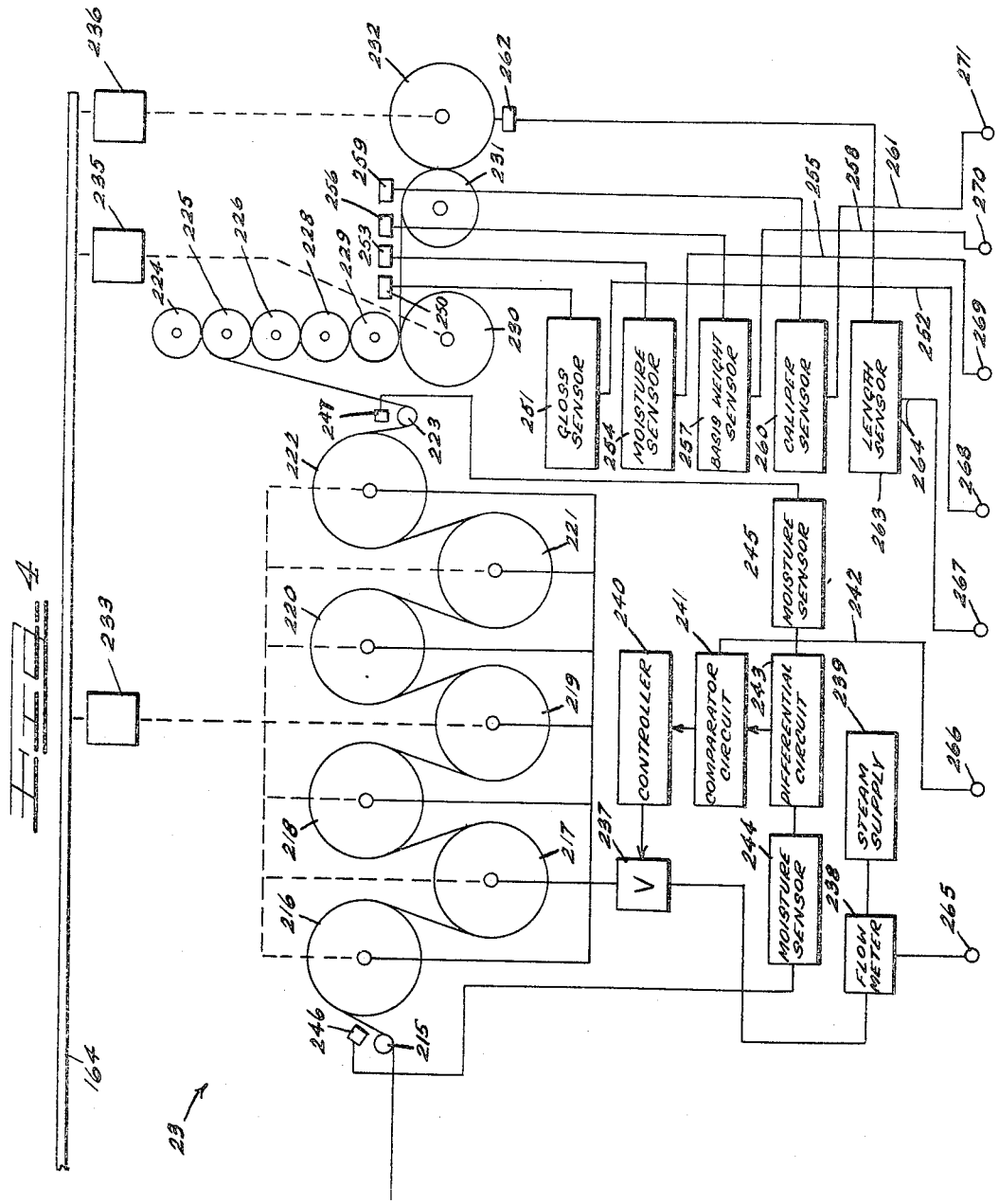

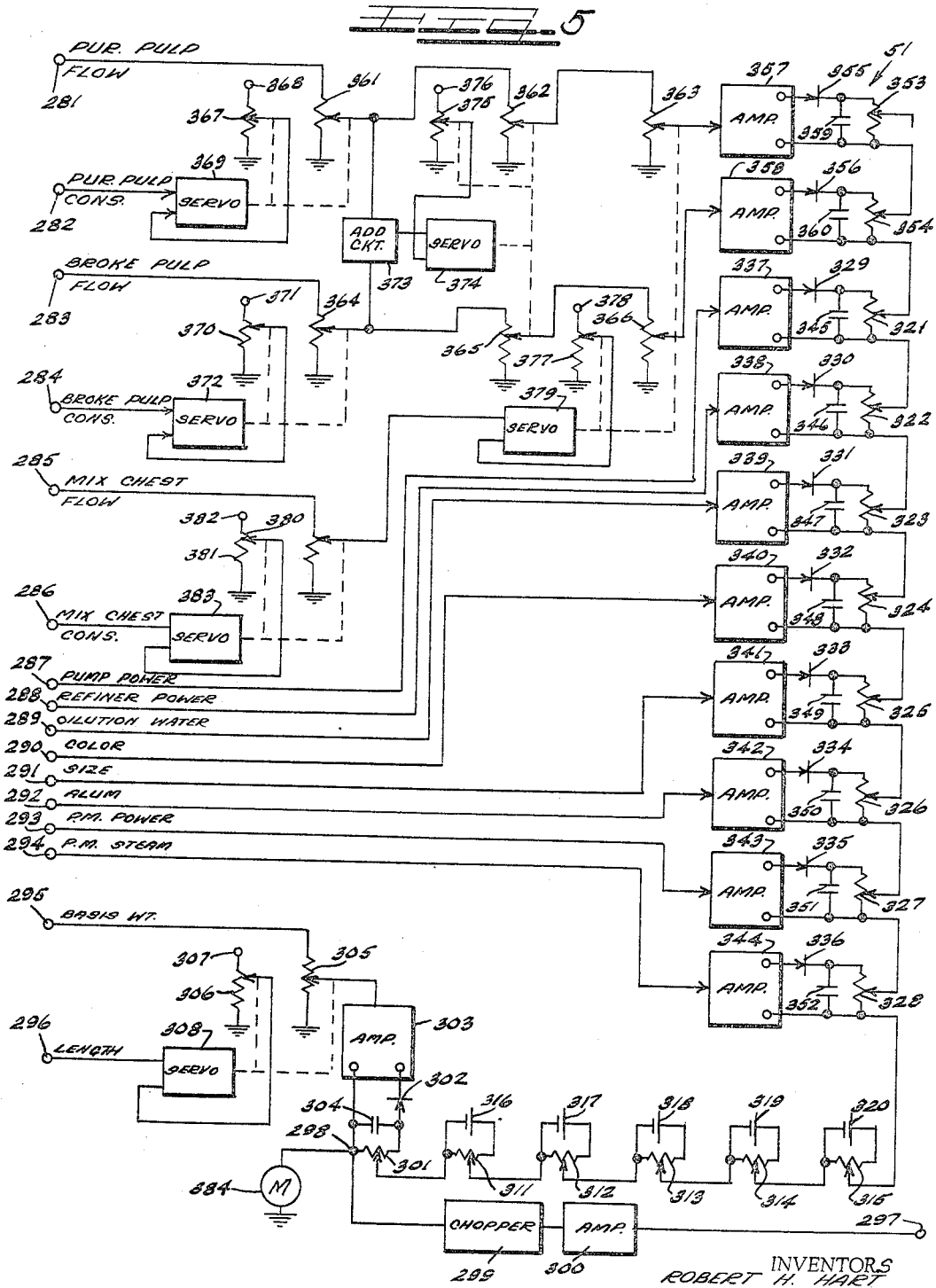

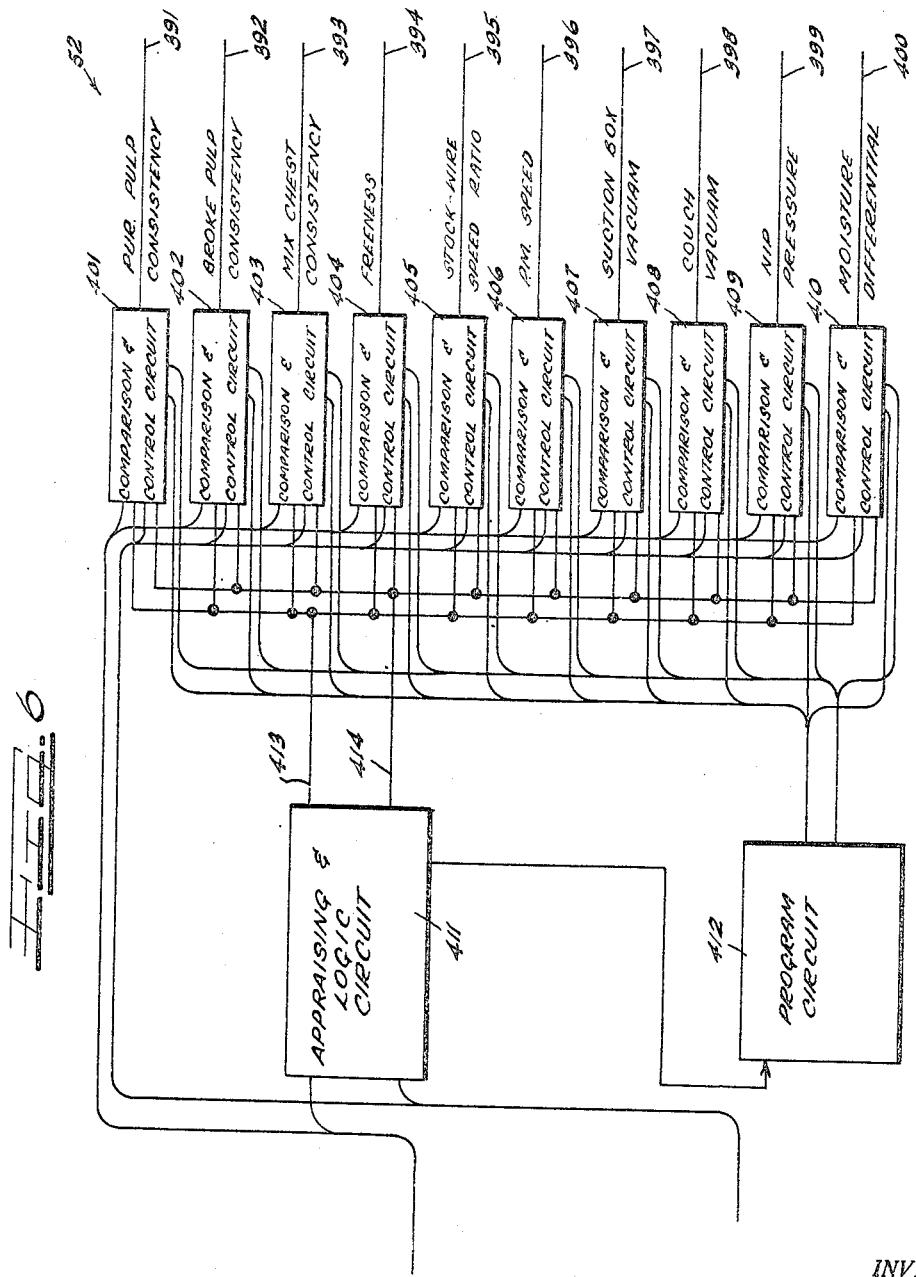

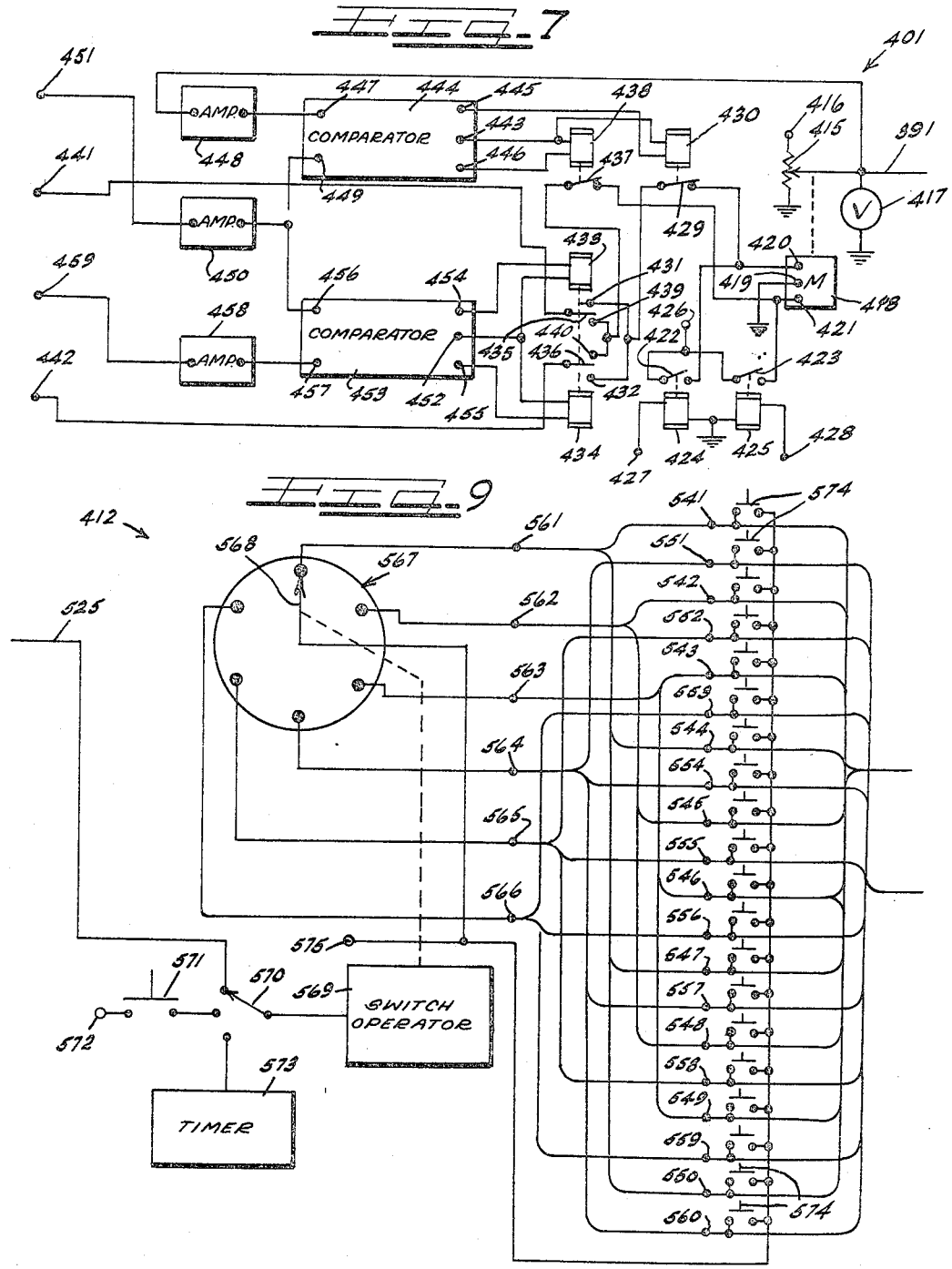

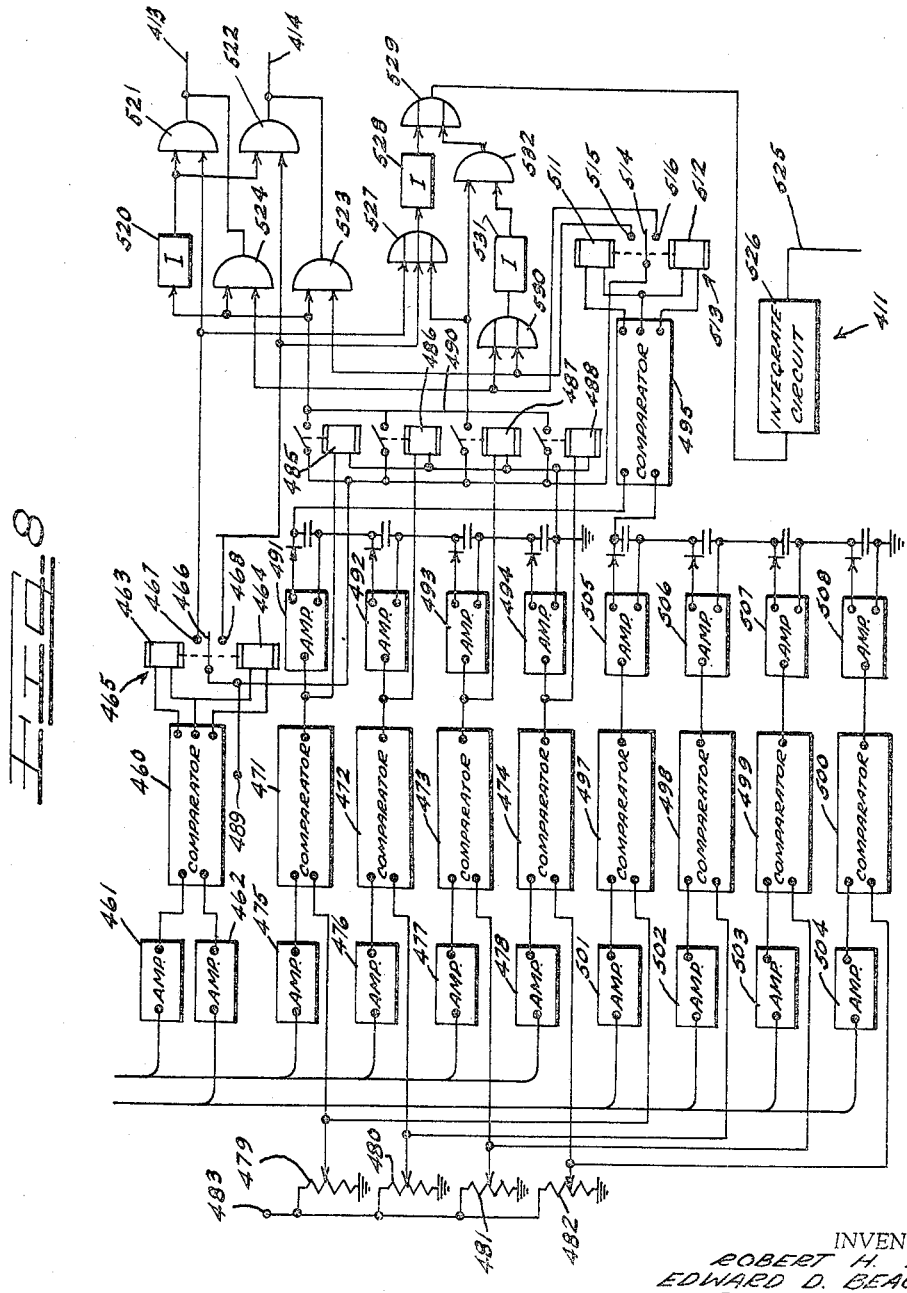

3,490,689
AUTOMATED MACHINE SYSTEM
Robert H. Hart, Edward D. Beachler, Edgar J. Justus, and Dirk J. Veneman, Beloit, Wis., assignors to Beloit Corporation, Beloit, Wis., a corporation of Wisconsin
Continuation of application Ser. No. 282,461, May 22, 1963. This application Sept. 23, 1966, Ser. No. 581,656
Int. Cl. G06f 15/46; G06g 7/48, 7/58
U.S. Cl. 235—151.1                                      12 Claims

ABSTRACT OF THE DISCLOSURE

An automatic machine system for a machine which has a plurality of control sections wherein the positions of said controls is detected and recorded for subsequent comparison and having means for controlling the plurality of variables and including a computer which is connected to receive inputs from the detecting and recording means and to supply an input thereto and having a comparison and logic control means and a storage means for optimizing the values of the controls so as to optimize the operation of the machine.

---

This is a continuation of Ser. No. 282,461 filed May 22, 1963, now abandoned.

This invention relates to an automated machine system wherein an automatic control is applied to an operating system in a manner to produce a continual improvement in the efficiency and economy of its operation while maintaining a uniform high quality of the output product. The system is very flexible and permits the logging of performance data for analysis, computations and subsequent improvement in overall performance. Important features of the invention relate particularly to a paper making machine system and improvements in the efficiency, economy and reliability of operation thereof and the quality of paper produced thereby.

Expectation of profit is the economic driving force motivating business activity in a free enterprise economy. An increase in this profit for a given organization can be accomplished by discovering and following any of a number of courses of improved action. One method often referred to as "Operations Research" provides a scientific approach to the selection of those courses of action best fulfilling a particular objective set forth by management. "Operations Reasearch" is the attack of modern science on problems of likelihood which arise in the management and control of men and machines, materials and money in their natural environment. Its special technique is to invent a strategy of control by measuring, preparing and predicting probable behavior through a scientific model of a situation.

Often this objective involves more efficient production and consequently much effort has been spent on ways to decrease production costs by seeking best or optimum operating conditions. Today, most "Operations Research" problems involve the mathematical description of complex industrial situations such that by appropriate solution of the mathematical model, management can be given quantitative information helpful for making operating decisions. Such a model may be defined as a device, physical or symbolic, which behaves in a manner similar enough to some other system so that useful knowledge about the system may be gained from a study of the model. Usually the most desirable is the mathematical model, which employs mathematical statements to represent the system and enables responses to be calculated rather than measured. The measure of effectiveness is expressed as a function of a set of variables, at least one of which is subject to control. The variables involved are often functionally interrelated so that they behave similarly to the active variables in the realistic system simulated. As the variables are manipulated their effectiveness in optimizing the objective is changed. Hence, the effectiveness is a function of the controllable variables. Often there are restrictions imposed on the values of the independent variables, or functional restraints involving these variables, and such restraints are expressed by supplementary equations and/or in-equations. However, it may happen that operating information, theoretical or empirical, is not available for setting up the entire mathematical model. In this case, an experimental program using laboratory equipment to simulate the appropriate industrial process and to allow for the determination of the desirable supplementary operating information is often necessary.

In brief, a model is never more than a partial representation of reality. It is a good model if, despite its incompleteness, it can accurately predict the effect of changes in the system on the system's overall effectiveness. The adequacy of the model can be tested by determining how well it does predict the effect of these changes. The solution can be evaluated by comparing results obtained without applying the solution with results obtained when it is used. These evaluations may be performed retrospectively by the use of past data, or by trial run or pretest. Testing requires careful analysis as to what are and what are not valid data.

From the above description it appears that such optimization procedures in which mathematical models are employed may become extremely complicated particularly in the more complex processes of manufacture. Consequently, for accuracy and realistic results much improvement is to be desired. An additional problem encountered with a laboratory model may best be described as follows:

When a process is transferred from the laboratory into full scale equipment, the relationship between the variables remains approximately the same. For example, if it is found in the laboratory that as temperature is increased yield rises to a maximum and then falls, approximately the same relationship is expected to be maintained in plant equipment. However, if 78° F. was optimum as determined by a thermometer inserted in a glass beaker, it does not necessarily follow that 78° F. is the optimum as measured by a thermocouple in a large steel pot. This situation is even clearer when mechanical variables are considered. It requires no imagination at all to see the difficulty in translating the revolutions per minute of a glass stirrer to the agitator of a tank. As a result the contour system describing the relationship between the variables will usually be displaced and even distorted due to "scale up" effects.

In the past, the only statitstical tool available to determine optimum conditions in the plant was the same designed experiment used in the laboratory or pilot plant. Of course, the major difficulty with a designed experiment is that by its very nature it will upset production for varied lengths of time depending on the complexity of the design. The use of a designed experiment can certainly be justified when faced with a very sick process and the necessity of a reasonably fast cure commonly called "crash program." However, the vast majority of processes are just slightly ill, and if faced with the prospect of an experiment disrupting production, management frequently decides that the cure is worse than the disease. For example, it is very common to find a process producing yields of 80% of theoretical while optimum laboratory conditions will produce 88%. Certainly management would like to approach, if not surpass, the 88% but if the process is profitable at 80% and sales are heavy the motivation to approve a "crash program" is weak indeed.

Besides the "Operations Research" approach and the designed experiment discussed above the control or operation of a plant is largely a matter of experience and judgment of the operator. While many instruments or devices are provided to aid the operator, these instruments or devices serve primarily to indicate the operating conditions or to make adjustments which take into consideration only current conditions and many adjustments looking toward future operations of the plant are made entirely on the judgment and experience of the operator. In addition the results of the operator's judgment must wait for a lapse of time and not until that lapse is it known whether the operator's judgment was correct or erroneous.

This invention minimizes the above deficiencies through a new approach to the optimization of complex processes of manufacture.

Briefly the invention contemplates substantially instantaneous evaluation of actual dollar value of both input of raw materials and output of finished product. Also the value of internally stored "in process" product is appropriately included. In addition process variables which fall under the heading of variable costs and other factors which fall under the heading of fixed costs are continuously evaluated. In so doing it has been found that a "profit rate" may be obtained according to the following equation:

$$\text{Profit rate} = (Q \times Q') - (FC) - (VC)$$

In the equation "profit rate" is expressed in dollars per unit time.

Q is the produced quantity of products per unit time.
Q' is the unit price of the product.
(FC) represents the fixed cost per unit time. Under this heading will be found such items as: (a) depreciation; (b) overhead cost; (c) fixed labor; (d) building heat; (e) etc.
(VC) represents the variable cost per unit time. Under this heading will be found such items as: (a) raw materials; (b) additives; (c) steam; (d) other power requirements; (e) variable labor; (f) etc.

While the profit rate is constantly computed slight variations in process variables are introduced by means of a carefully prescribed pattern. This pattern requires that small changes are made in two or three variables from their standard operating conditions. Continued manufacture of material under the conditions described by the pattern will allow information to accumulate while material is being produced. While the process variables are being manipulated, both profit rate and product restraints are continuously surveyed. A particular set of variables will be manipulated only as long as:

(1) The profit rate increases, and
(2) The product restraints are not violated.

From the above it becomes abundantly clear that this procedure will result in an optimum economic operating condition without interrupting the particular process of manufacture, without having to mathematically describe the interrelationship between the process variables and without having to rely on a laboratory model of the apparatus used for this particular process. Elimination of these three points are the main objects of this invention.

An important feature of the invention is in the storage and subsequent read-out of data in a manner such as to obtain a set of values corresponding to the variables affecting the paper or other output product coming out of the machine at a particular time. This feature is important because of the time required for movement of a product or its constituents through a machine. For example, in a paper making machine, definite times are involved in moving pulp through a preparation section and movement of a web through a forming and press section and a drying and winding section.

Further important features of the invention relate to the provision of closed control loops for automatically maintaining certain parameters at certain values. This is important in stabilizing operation but is even more important with respect to parameters found to have a directly controlling effect on the character of the paper or other output product. At the same time this feature has the advantage of simplifying the operation of the automatic control system.

Specific features of the invention relate to the provision of closed control loops for maintaining the consistencies in pulp storage vats and in a mixing chest at certain values as controlled from the automatic control system.

Another specific feature of the invention relates to a closed control loop for controling freeness in a machine chest.

Another specific and very important feature relates to a control loop for automatic control of the slice between a headbox and the Fourdrinier wire, to obtain an optimum ratio of stock velocity to wire speed.

Another specific feature of the invention relates to control loops for controlling vacuum in vacuum boxes and in a couch roll.

A further specific feature of the invention relates to an automatic control loop for maintaining a set nip pressure between press rolls. Still another specific feature of the invention relates to a control loop for controlling the supply of steam to drying rolls in a manner to control the amount of decrease of moisture content in the web as the web passes through the dryer section.

Still further features of the invention relate to the provision of means for automatically performing an optimizing operation.

Other and more specific objects, features and advantages will become more fully apparent from the following detailed description taken in conjunction with the accompanying drawings which illustrate a preferred embodiment and in which:

FIGURE 1 is a schematic block diagram of a paper making machine control system constructed in accordance with the principles of this invention;

FIGURE 2 is a schematic block diagram of pulp preparation section of the system of FIGURE 1;

FIGURE 3 is a schematic diagram of a forming and press section of the system of FIGURE 1;

FIGURE 4 is a schematic diagram of a drying, calender and winding section of the system of FIGURE 1;

FIGURE 5 is a schematic electrical diagram of a profit rate computer of the system of FIGURE 1;

FIGURE 6 is a schematic diagram of a comparison, logic and control circuit of the system of FIGURE 1;

FIGURE 7 is a schematic diagram of a comparison and control circuit of the circuit of FIGURE 6;

FIGURE 8 is a schematic diagram of an appraising and logic circuit of the circuit of FIGURE 6; and FIGURE 9 is a schematic diagram of a program circuit of the circuit of FIGURE 6.

Referring to FIGURE 1, reference numeral 20 generally designates an automatically controlled paper-making machine constructed according to the principles of this invention. In the machine 20, plup is supplied to a preparation section 21 which feeds stock to the headbox of a forming and press section 22, from which a web is fed to a drying and winding section 23. An automatic control system generally designated by reference numeral 24 is provided for performing various functions. This system records the values of variables and also records quality or performance values, it provides for the determination of profit rate, and it provides for the adjustment of variables to obtain the highest possible profit rate while maintaining quality and performance values within specified limits. The system also provides for the logging of performance data for examination by an operator, and the recording of data on punched tape for subsequent computing and examination operations.

An important feature of the system 24 is in the storage and subsequent read-out of data in a manner such as to obtain a set of values corresponding to the variables affecting the paper coming out of the machine at a particular time. This feature is important because of the time required for movement of pulp through the preparation section 21 and the time required for movement of the web through the forming and press section 22 and the drying and winding section 23.

In the system illustrated in FIGURE 1, two magnetic tape recording and reproducing systems 25 and 26 are used for the storage and subsequent read-out operation. System 25 as diagrammatically illustrated comprises an endless loop of tape 27 entrained on rollers 28 and 29, the roller 29 being driven from an adjustable speed drive unit 30. A reproducing head section 31 is provided, comprising a plurality of heads in spaced relation along a line transverse to the tape 27. A recording head section 32 comprises a like plurality of recording heads, spaced transversely with respect to the tape and aligned with the reproducing heads, the recording heads being spaced at various distances from the reproducing heads, to obtain desired delays. The tape 27 is driven at a speed approximately proportional to the speed of movement of pulp through the preparation section 21. The recording heads in the unit 32 are connected to the outputs of a multi-channel amplifier 33 having inputs connected through a cable 34 to output terminals of the pulp preparation section 21.

The reproducing heads of the unit 31 are connected to inputs of a multi-channel amplifier 35, having additional inputs connected through a cable 36 to the outputs of various sensing means in the forming and press section 22 and the drying and winding section 23. The outputs of the multi-channel amplifier 35 are applied to recording heads of a unit 37 in the system 26. The heads of the unit 37 engage a tape 38 fed from a supply roll 39, thence over a roller 40, thence under the recording head unit 37, and thence over rollers 41, 42, 43 and 44 to a take-up roll 45. The rollers 41 and 44 and also the take-up roller 45 are driven from an adjustable drive unit 46, as diagrammatically illustrated, which may be controlled in response to a speed signal applied from the forming and press section 22 through a line 47, to drive the tape 38 at a speed proportional to the speed of movement of the web.

A first reproducing head unit 48 is engaged with the tape 38 adjacent the recording head unit 37 and has a plurality of heads along a line transverse to the tape and aligned with the corresponding heads of the recording head unit 37. Another reproducing head unit 49 engages the tape 38 between the rollers 43 and 44 and, like the unit 48, comprises a plurality of heads aligned with heads of the recording head unit 37, to engage the corresponding tracks of the tape 38. With this arrangement, there is a certain delay between the signals produced from the units 48 and 49, proportional to the speed of movement of the tape.

The heads of the unit 48 are connected to inputs of a multi-channel amplifier 50 having outputs connected to inputs of a profit rate computer 51 and also to comparison, logic and control circuits 52. The output of the profit rate computer 51 is applied through a line 53 to an input of the multi-channel amplifier 35 to record a profit rate signal on one track of the tape 38.

The heads of the reproducing head unit 49 are connected to inputs of a multi-channel amplifier 54 having outputs connected to the comparison, logic and control through a cable 55 to control various variables in the paper making machine.

In addition to being applied to the circuit 52, the outputs of the multi-channel amplifier 54 are applied through a scanner 56 to an analog-to-digital converter 57, the output of which is applied to a storage section 58 and selectively to a tape punch 59 and a typewriter 60. Certain performance values may also be applied to the storage section 58 from a unit 61 and the output of the storage section may be applied selectively to the tape punch section 59, the typewriter 60 or the comparison, logic and control circuit 52.

In the general operation of the system, the operator may initially decide upon a particular type and grade of paper to be made, using his experience with respect to the operation of the machine and his knowledge of the market values of the various types and grades of paper. The operator then manually sets up the machine for operation to produce the particular type and grade of paper which he had selected, again using his experience to attempt to obtain the most profitable rate of operation.

After the machine is in operation, changes in variables may be made manually, or automatically in accordance with a predetermined program, and the effect of such changes may be determined, and then additional changes may be made according to the effect produced by the previous changes. In the case of at least some of the variables, particularly those affecting the forming and press section and the drying and winding section, the comparison, logic and control circuit 52 may operate to automatically cause changes in the proper direction to increase overall performance. It will be noted that the circuit 52 responds to the results of the latest test, picked up by the heads of the reproducing head unit 48, and the results of a preceding test, picked up by the heads of the reproducing head unit 49. The general operation of the comparison, logic and control circuit 52 may be summarized as follows:

(1) If the performance values (for example, moisture, basis weight, caliper, etc.) in both the latest and preceding tests are within the desired limits and if profit rate is increased, then the variable or variables changed from the preceding test to the latest test are changed in the same direction. If, however, the profit rate is decreased, then the variables are changed in the opposite direction.

(2) If the performance values in the latest test are beyond the desired limits, but were within the desired limits in the preceding test, the variables are changed in the opposite direction regardless of the effect on profit rate.

(3) If one or more of the performance values in the preceding test were beyond limits, but were brought within limits in the latest test, no change is made in the variables, regardless of the effect on profit.

(4) If the performance values in both the preceding and latest tests are beyond desired limits, but the total deviation from desired values is increased, the variables are changed in the opposite direction. If the total deviation was decreased, the variables are changed in the same direction.

(5) If the performance values in both the latest and preceding tests are within limits and there is no change in profit rate, then no change in the variables may be made. However, a change in other variables may be arbitrarily made according to a predetermined program to determine whether changes should be made in such variables. The same thing may be true if the performance values in both tests are beyond limits while the total deviation from the desired values remains the same. It will be understood that this optimizing operation may be continued indefinitely.

At any desired time, the conditions of operation of the machine may be recorded on a log sheet by means of the typewriter 60, or recorded on punched tape by means of the tape punch 59. In addition, it is desirable to so register the results regularly, and preferably at or near the end of a winding of a roll. This is desirable for the reason that certain performance values cannot be measured, at least with a high degree of accuracy, on a moving web of paper. For example, tear, burst and tensile strength tests are best performed on a sample taken from a web of paper. Thus at the end of the winding of a roll, a sample may be taken therefrom and tear, burst and tensile strength tests performed thereon. The results of the tests may then be registered in the unit 61 and transferred to the storage section 58 along with data derived from the reproducer head unit 49 through the amplifier 54, scanner 56 and analog-to-digital convertor 57.

Preferably, the storage unit 58 comprises first and second sections, data being fed into the first section while the data previously stored therein is transferred to the second section. In addition, it preferably includes means for registering the difference between the data values stored in the two sections. With this arrangement, the results of one test may be logged by the typewriter 60, or registered on the punched tape, along with information as to the deviation of values from the previous test. Thus, for example, if the results of the tensile strength test are changed to go outside the desired limits while at the same time there has been a certain change in only one variable, the operator can readily ascertain the cause of the changed results of the tensile strength test, and he can then make the required adjustment in operation.

Accordingly, the operator at certain times such as at the end of the winding of a roll may make required changes in variables in order to keep performance values within desired limits and to improve the profit rate. If desired, the automatic optimizing operation of the comparison, logic and control circuit 52 may be then reinstituted. In some cases, the operator may desire to change the program of the changes in variables. In other cases, the operator may wish to temporarily discontinue the automatic optimizing operation and make manual changes in certain variables such as in the pulp preparation section and wait to see what results are recorded from such changes. In this respect, it is to be noted that the operation of the system is very flexible and always subject to the manual override of the operator.

When it appears desirable to do so for economic reasons or to obtain data as to production of other types and grades of paper, the operator may manually make changes to produce a different type and/or grade. The optimizing operations as above described may then be repeated as long as desired.

Thereafter, of course, still other types and/or grades of paper may be produced with the optimizing operation being then repeated. Ultimately, sufficient data is accumulated and stored on the punched tape from which the most profitable type or grade of paper to be produced can be estimated. Computer techniques can, of course, be used in this connection. Ultimately the most profitable type and grade of paper may be computed and the operation of the machine may be automatically shifted over to that type. The optimizing operation can still be continued, to attempt to obtain even higher profit rates and superior performance.

Referring now to FIGURE 2, the illustrated pulp preparation section 21 comprises a purchased pulp storage vat 70 to which pulp is supplied through a flow meter 71 and a broke pulp storage vat 72 to which pulp is supplied through flow meters 73 and 74, internal broke from the paper machine being applied through the flow meter 73 and broke from finishing operations being applied through the flow meter 74.

The pulp flows from the purchased pulp storage vat 70 and the broke pulp storage vat 72 through flow meters 75 and 76 into a mixing chest 77. Pulp from the mixing chest 77 flows through a flow meter 78 into a refiner 79 from which it flows to a machine chest 80. Pulp from the machine chest 80 flows through a flow meter 81 to the forming and press section, described hereinafter in conjunction with FIGURE 3.

In addition to purchased and broke pulp, color, size and alum may be supplied to the mixing chest from suppliers 82, 83 and 84 and through valves 85, 86 and 87 and flow meters 88, 89 and 90. Other additives may, of course, be supplied in similar fashion to the mixing chest 77.

Important features of the pulp preparation section reside in the provision of closed control loops for automatically maintaining certain parameters at certain values. This is important in stabilizing operation but is even more important in that it is found that such parameters have a directly controlling effect on the characteristics of paper made by the machine and with the closed control loops, parameters are established which can be measured and controlled to obtain optimum operation. An additional advantage is in the simplification of the operation of the automatic control of the system.

In particular, closed control loops are provided for maintaining the consistencies in the vats 70 and 72 and in the mixing chest 77 at certain values. The closed control loop for the purchased pulp vat 70 comprises a consistency measuring device or sensor 91, a device known in the art which produces an electrical signal proportional to consistency, a comparator circuit 92 which develops an error signal proportional to the difference between the signal from the sensor 91 and a control signal applied on a line 93, a controller 94 which responds to the error signal from the comparator circuit 92, and a valve 95 controlled by the controller 94 to control the supply of water to the vat 70, the water being applied to the valve 95 through a flow meter 96 connected to a main water line 97.

Similarly, the control loop for the broke pulp vat 72 comprises a consistency sensor 99, a comparator circuit 100 responsive to the signal from the sensor 99 and a control signal on a line 101, a controller 102 and a water valve 103 controlled by the controller 102, the water valve 103 being connected through a flow meter 104 to the main water supply line 97.

The control loop for the mixing chest 77 comprises a consistency sensor 105, a comparator circuit 106 which receives signals from the sensor 105 and from a control line 107, a controller 108 controlled by an error signal from the comparator circuit 106 and a water valve 109 controlled by the controller 108, valve 109 being connected to the water supply line 97 through a flow meter 110.

Another very important closed control loop is provided for controlling the freeness in the machine chest 80. A freeness sensor 111 develops a signal corresponding to the freeness of the pulp in the machine chest 80. A comparator circuit 112 compares the signal from the sensor 111 with a control signal applied on a line 113 and develops an error signal which is applied to a controller 114 which controls the position of the plug in the refiner 79. The freeness of the pulp is a function, in large part, of the plug position in the refiner 79.

The refiner 79 is driven by an electric motor 115 connected through a watt meter 116 to a suitable electrical power source.

To record the signals developed by the various flow meters, the watt meter 116 and the various control signals, as well as to apply the control signals, a series of electrical terminals 121–138 are respectively connected to the flow meter 71, the control line 93, the control line 101, the flow meter 74, the flow meter 73, the flow meter 104, the flow meter 76, the flow meter 96, the flow meter 75, the flow meter 88, the flow meter 89, the flow meter 90, the control line 107, the flow meter 110, the flow meter 78, the watt meter 116, the control line 113 and the flow meter 81.

Referring now to FIGURE 3, which illustrates the forming and press section 22, pulp from the machine chest 80 of the pulp preparation system 21 is supplied through a valve 140 to the inlet of a pump 141 which also receives white water from a wire pit 142. The outlet of the pump 141 is connected through a valve 143 to a headbox 144. A pressure is maintained in the head box 144 by means of a compressor 145 driven by a motor 146.

The pulp flows from the head box 144 out through a slice 144a onto a wire 147 which is trained on a breast roll 148 and a couch roll 149. The upper portion of the wire 147 moves over table rolls 150 and thence over suction boxes 151 and 152 before reaching the couch roll 149. Wire rolls 153 and 154 and a stretch roll 155 engage the lower portion of the wire.

From the wire 147, the web is passed through a press section which, as diagrammatically illustrated, includes a first pair of press rolls 157 and 158 and a second pair of press rolls 159 and 160. From the press section, the web is passed to a dryer, calender and winding section illustrated in FIGURE 4.

To drive the rolls 149, 158 and 160, they are respectively connected through couplings 161, 162 and 163 to a common drive shaft 164 which is coupled to a drive motor 165. The common drive shaft 164 is also coupled to dryer and calender rolls as indicated in FIGURE 4, described hereinbelow.

Highly advantageous features of the forming and press section 22 reside in the provision of control loops for automatically maintaining certain parameters at certain values.

An important control loop is used in the control of the slice 144a. The operation thereof is based on the fact that the ratio of stock velocity to wire speed has a direct effect on the character of the paper produced. The stock or pulp velocity at the slice is a function of the head box pressure, approximately a square root function. In the illustrated system a ratio signal is developed proportional to the ratio of wire velocity to stock velocity, and the ratio signal is compared with a control signal to develop an error signal which is used to control the vertical position of the slice member 144a of the head box.

In particular, a head box pressure sensor 167 develops a signal proportional to the pressure in the head box 144. The pressure signal is applied to a modifying circuit 168 which develops a signal proportional to the square root of the head box pressure and which is thus a stock velocity signal. A wire velocity signal is developed by a speed sensor or tachometer 169 coupled to the roll 148. Such stock and wire velocity signals are applied to a ratio circuit 170 and the ratio signal developed therefrom is applied to a comparator circuit 171 which develops an error signal proportional to the difference between the ratio signal and a control signal applied on a line 172. The error signal from the circuit 171 is applied to a controller 173 which controls the vertical position of the slice 144a as diagrammatically illustrated.

Two additional control loops are used for controlling vacuum in the vacuum boxes 151 and 152 and in the couch roll 149. In particular, a vacuum source 175 is connected to the vacuum boxes 151 and 152 through a valve 176 and to the couch roll 149 through a valve 177. Valves 176 and 177 are controlled by controllers 178 and 179 to which error signals are applied from comparator circuits 180 and 181. Circuits 180 and 181 respond to control signals applied on lines 182 and 183 and to signals developed by vacuum sensors 184 and 185 coupled to the vacuum box 151 and the couch roll 149. If desired, separate valves and associated control systems may be used for each of the vacuum boxes 151 and 152, instead of a common valve 176 as illustrated.

Another important control loop is used to control the nip pressure between the press rolls 159 and 160. As diagrammatically illustrated, a pneumatic motor 187 is arranged to exert a controlled force on an upper bearing 188 for the roll 159 and is coupled through a valve 189 to a compressed air source 190. Valve 189 is controlled by a controller 191 which responds to an error signal developed by a comparator circuit 192 which responds to a control signal on a line 193 and to a signal developed by a force or pressure sensor 194. If the pressure signal changes above or below the control signal applied on the line 193, the controller 191 closes or opens the valve 189 to bring the pressure back to a value determined by the control signal. It will be appreciated that this pressure control may be desirably applied to more than one set of pressure rolls in the press section.

To control the speed of the common drive shaft 164, a speed controlled unit 196 is connected to the motor 165 and is controlled by a control signal applied on a line 197.

A watt meter 198 is connected between the motor 165 and terminals 199, connected to a suitable voltage source, a power signal being developed on a line 200. Another watt meter 201 is connected between the motor 146 and terminals 202 connected to a suitable source of voltage. A watt meter 203 may sense the power applied to a motor 204 mechanically connected to the pump 141.

To record the various signals and to apply control signals, a series of terminals 205–212 are connected to the line 172, the watt meter 201, the watt meter 203 and lines 200, 197, 182, 183 and 193.

Referring now to FIGURE 4, which illustrates the dryer section 23, the web from the forming and press section 22 is passed under an idler roller 215 and thence about a series of drying drums 216–222, thence under another idler roller 223 and to a calendar section including rolls 224–230, and thence over a roll 231 to be wound on a roll 232. When the roll 232 reaches a certain diameter, or has a certain length of paper wound thereon, it is removed and a new core is placed in position for winding of the paper thereon.

The drying drums 216–222 are coupled to the common drive shaft 164 through a coupling unit 233, roll 230 is coupled to the shaft 164 through a unit 235 and the roll 232 is coupled to the shaft 164 through a unit 236.

The drying drums 216–222 are connected through a valve 237 and a flow meter 238 to a steam supply 239. A control loop is provided for controlling the valve 237 in a manner to control the amount of decrease of moisture content in the web as the web passes through the dryer section. In particular, the valve 237 is controlled by a controller 240 which responds to an error signal developed by a comparator circuit 241. Circuit 241 responds to a control signal applied on a line 242 and to a signal applied from a differential circuit 243 which develops a signal proportional to the difference between the signals developed by two moisture sensor circuits 244 and 245, connected to moisture sensor devices 246 and 247. Device 246 is located between the idler roller 215 and the first drying drum 216, while device 247 is located between the final drying drum 222 and the idler roller 223.

In operation, if the amount of moisture decreases, as measured by the difference in moistures at the devices 246 and 247, is below a value determined by a control signal on line 242, an error signal is applied from the comparator circuit 241 to the controller 240 to cause the valve 237 to open and apply additional steam to the drying drums and thus increase the amount of the moisture decrease until it corresponds to that determined by the signal on line 242. Similarly, the valve 237 may be operated to decrease the amount of steam if the amount of moisture decrease is too large.

Means are provided for making various performance tests on the paper web travelling from the calender section to the winding section. In particular, a gloss sensing device 250 is connected to a gloss sensor circuit 251 to develop a signal on a line 252, a moisture sensing device 253 is connected to a moisture sensor circuit 254 to develop a signal on a line 255, a basis weight sensing device 256 is connected to a basis weight sensor circuit 257 to develop a signal on a line 258, and a caliper device 259 is connected to a caliper sensor circuit 260 to develop an output signal on a line 261. In addition, a length sensing device 262, operated in conjunction with the roll 232, is connected to a length sensor circuit 263 to develop an output signal on a line 264. It will be understood that additional performance tests may be made as desired or required.

For connection of the section 23 to the recording, computing and control circuits, a terminal 265 is connected to the flow meter 238 while terminals 266–271 are connected to the lines 242, 264, 252, 255, 258 and 261.

FIGURE 5 illustrates the circuit of the profit rate computer 51. In this circuit, signals are applied to sixteen input terminals 281–296 proportional to the values of variables affecting profit, as developed or applied to the paper machine in the manner as described above, and as subsequently recorded and reproduced to obtain appropriate time delays, such that the signals applied to the computer circuit at any given time correspond to the conditions affecting a particular portion of the paper produced by the machine. In particular, the signals applied to the terminals 281–296 respectively correspond to purchased pulp flow, purchased pulp consistency, broke pulp flow, broke pulp consistency, mixing chest flow, mixing chest consistency, pump power, refiner power, dilution water, color, size, alum, paper machine power, paper machine steam, basis weight and length.

The illustrated computer circuit 51 serves to develop an AC output voltage at an output terminal 297 proportional to profit rate, the output signal being proportional to a DC signal developed at a circuit point 298 which is converted to an AC signal by a chopper 299 and applied to the output terminal 297 through an AC amplifier 300. The DC signal at the circuit point 298 is the summation of a plurality of DC voltages, one of which is of one polarity and proportional to production rate and the others being of the opposite polarity and proportional to various fixed and variable costs.

In particular, a DC voltage proportional to production rate is developed at a potentiometer 301, between its movable contact and one end terminal thereof. To develop this signal, the end terminals of the potentiometer 301 are connected through a rectifying diode 302 to the output of an amplifier 303, a filter capacitor 304 being connected across the potentiometer 301. An AC voltage is applied to the input of the amplifier 303 proportional to the product of the basis weight signal at input terminal 295 and the length signal at input terminal 296. Terminal 295 is connected through a precision potentiometer 305 to ground, the movable contact thereof being connected to the input of the amplifier 303. The movable contact of potentiometer 305 is mechanically ganged to the movable contact of a potentiometer 306 connected between ground and a terminal 307, connected to a suitable source of constant voltage. The movable contact of potentiometer 306 is connected to one input of a servo unit 308 having a second input connected to the input terminal 296.

In operation, the servo unit 308 adjusts the movable contact of potentiometer 306 to a position such that the voltage between the contact and ground is equal to the voltage applied to the input terminal 296, proportional to length. The position of the movable contact of potentiometer 305 is simultaneously adjusted and as a result there is applied to the input of amplifier 303 a signal proportional to the product of the basis weight signal applied to terminal 295 and the length signal applied to terminal 296. Thus a signal is produced at the output of amplifier 303 proportional to the amount of paper produced per unit time, and by adjustment of the potentiometer 301 according to the unit price or value of the paper, a DC voltage is developed at the potentiometer 301 proportional to the money value of the production per unit time.

To produce voltages proportional to the cost rate of items which remain fixed for substantial periods of time, a series of five potentiometers 311–315 are connected to batteries 316–320, or other constant voltage sources, each potentiometer being operative to develop an adjustable voltage between its movable contact and one end terminal thereof, with such adjustable voltages being applied in series relation to the voltage developed by potentiometer 301, but of opposite polarity. The potentiometers 311–315 may be manually adjusted according to the cost per unit time of overhead cost, depreciation, fixed labor costs, variable labor costs, and heating. Other costs may be introduced in similar fashion.

To produce voltages proportional to the variable signals applied to the input terminals 287–294, another series of potentiometers 321–328 are connected through rectifying diodes 329–336 to the outputs of amplifiers 337–344 having inputs connected to the terminals 287–294, filter capacitors 345–352 being connected across the potentiometers 321–328. Each of the potentiometers 321–328 is adjusted to produce between its movable contact and one end terminal thereof a DC voltage proportional to the cost rate of the variable related to the corresponding input terminal. For example, the signal applied to the input terminal 287 may be proportional to the power consumed in driving the pumps, in kilowatts, and the potentiometer 321 may be adjusted according to the cost of a kilowatt hour of electricity.

Additional potentiometers 353 and 354 are provided for developing signals proportional to the value or cost rate of purchased and broke pulp, these potentiometers being connected through rectifying diodes 355 and 356 to the outputs of amplifiers 357 and 358, filter capacitors 359 and 360 being connected across the potentiometers 353 and 354. The consumption of purchased and broke pulp, as related to a particular portion of paper produced by the machine, is not directly produced by sensing devices, and it is necessary to perform certain computer operations in order to produce such signals.

In particular, the flow of purchased pulp as related to a particular portion of paper produced by the machine is proportional to the product of (1) the flow measured by meter 75 at a certain time, (2) the consistency in the vat 70 as measured by the signal applied on line 93 at said certain time, (3) the flow from the mixing chest as measured by the meter 78 at a later time, and (4) the consistency in the mixing chest as determined by the signal on line 107 at said later time, and is inversely proportional to the sum of two products, the first product being the products of values (1) and (2) above and the second product being the product of (5) the flow from the broke pulp storage vat as measured by the meter 76 at said certain time and (6) the consistency in the vat 72 as measured by the signal applied on line 101 at said certain time. The flow of broke pulp is determined in a similar fashion, values (5) and (6) being substituted for values (1) and (2) in the above expression.

The purchased pulp input terminal 281 is connected through a potentiometer 361 to ground, the movable contact of potentiometer 361 being connected through a potentiometer 362 to ground, and the movable contact of potentiometer 362 being connected through a potentiometer 363 to ground, the movable contact of potentiometer 363 being connected to the input of amplified 357. Similarly, the broke pulp flow input terminal 283 is connected through a potentiometer 364 to ground, the movable contact of potentiometer 364 being connected through a potentiometer 365 to ground, the contact of potentiometer 365 being through a potentiometer 366 to ground, and the contact of potentiometer 366 being connected to the input of amplifier 358.

The contact of potentiometer 361 is mechanically ganged to the contact of a potentiometer 367 connected between ground and terminal 368 to which a reference voltage is applied, the contact of potentiometer 367 being connected to one input of a servo unit 369 with the other input of the servo 369 being connected to the input terminal 282. With this arrangement, the contacts of potentiometers 361, 367 are automatically adjusted to a position corresponding to the magnitude of the purchased pulp consistency signal applied to input terminal 282 and the signal at the contact of potentiometer 361 is proportional to the product of purchased pulp flow and purchased pulp consistency.

In a similar manner, the contact of potentiometer 364 is ganged to the contact of a potentiometer 370 connected between ground and a terminal 371 to which a reference voltage is applied, the contact of potentiometer 370 being connected to one input of a servo unit 372 with a second input of the servo unit 372 being connected to the input terminal 284.

With this arrangement a signal is developed at the contact of potentiometer 364 proportional to the product of broke pulp flow and broke pulp consistency.

The signals developed at the contacts of potentiometers 361 and 364 are applied to the potentiometers 362 and 365 and are also applied to an addition circuit 373 which applies a signal to one input of a servo unit 374 having a second input connected to the contact of a potentiometer 375 connected between ground and a terminal 376 to which a reference voltage is applied. The servo unit 374 is mechanically connected to the contacts of potentiometers 362, 365 and 375 which are ganged together. In operation, the contacts of potentiometers 362 and 365 are moved to positions corresponding to the signal applied from the addition circuit 373, but in inverse relation, i.e., with the output-to-input voltage ratios of the potentiometers 362 and 365 being changed in inverse proportion to the voltage applied from the addition circuit 373.

The contacts of potentiometers 363 and 366 are mechanically ganged together and to the contact of a potentiometer 377 connected between ground and a terminal 378 to which a reference voltage is applied, the contact of potentiometer 377 being mechanically connected to a servo unit 379 and being electrically connected to one input thereof. The other input of the servo unit 379 is connected to the contact of a potentiometer 380 connected between ground and the mixing chest flow input terminal 285. The contact of potentiometer 380 is mechanically ganged to the contact of a potentiometer 381 connected between ground and a terminal 382 to which a reference voltage is applied. The contact of the potentiometer 381 is connected to one input of a servo unit having a second input connected to the mixing chest consistency input terminal 286.

In operation, a voltage is developed at the contact of potentiometer 380 proportional to the product of mixing chest flow and mixing chest consistency and this signal through the operation of the servo unit 379 and the potentiometer 377 controls the positions of the contacts of potentiometers 363 and 366 so that the output-to-input voltage ratios of the potentiometers 363 and 366 are proportional to the product of mixing chest flow and mixing chest consistency.

Accordingly, the required multiplying and dividing operations are performed and signals are applied to the amplifiers 357 and 358 proportional to purchased pulp flow and broke pulp flow, as they affect a particular portion of paper coming from the machine. The potentiometers 353 and 354 are adjusted in accordance with an evaluation of the worth of purchased and broke pulp. Thus a DC voltage is developed at the circuit point 298 proportional to the profit rate. This voltage may be measured by a meter 384 and is converted by the chopper 299 to an AC voltage which is applied through the amplifier 300 to the output terminal 297. The output signal is applied through the line 53 to the multi-channel amplifier and is recorded on the tap 38, to be picked up by a reproducing head of the unit 48 and, with a delay, by the head of the unit 49. Such signals from the reproducing heads are applied through channels of the amplifiers 50 and 54 to the comparison, logic and control circuit 52.

Referring now to FIGURE 6, the comparison, logic and control circuit 52 develops output voltages on lines 391–400, which are connected through the cable 55 to terminals 122, 123, 133, 137, 205, 209, 210, 211, 212 and 266 of the paper machine sections, to control purchased pulp consistency, broke pulp consistency, mixing chest consistency, freeness, stock-wire speed ratio, paper machine speed, suction box vacuum, couch vacuum, nip pressure and moisture differential. The output lines 391–400 are connected to comparison and control circuits 401–410 which are connected to an appraising and logic circuit 411 and to a program circuit 412. In general, the appraising and logic circuit 411 determines whether overall performance has been increased or decreased, and supplies signals to the circuits 401–410 to effect changes in the proper variables. A signal is applied on line 413 if overall performance has been increased and on a line 414 if overall performance has been decreased. Line 413 may be referred to as a "same" line, to indicate that a variable should be changed in the same direction if a change thereof has produced an increase in overall performance. Similarly, the line 414 may be referred to as a "opposite" line. The program circuit 412 functions to make changes in selected variables in a certain programmed sequence.

FIGURE 7 is a schematic diagram of the comparison and control circuit 401, the other comparison and control circuits 402–410 being the same. In the circuit 401, the output line 391 is connected to the movable contact of a potentiometer 415 connected between ground and a terminal 416 to which a constant reference voltage may be applied, the position of the contact being thus determinative of the voltage of line 391 which voltage is applied to the comparator circuit 92 of the pulp or preparation system of FIGURE 2, to control consistency in the purchased pulp storage vat 70. This control voltage may be indicated by a suitable volt meter 417.

The position of the contact of potentiometer 415 is controlled by a reversible motor 418 having a grounded terminal 419, a terminal 420 to which a voltage may be applied to energize the motor in one direction and a terminal 421 to which a voltage may be applied to energize the motor in the reverse direction.

To energize the motor 418 in response to signals from the program circuit 412, the motor terminals 420 and 421 are connected through contacts 422 and 423 of relays 424 and 425 to a terminal 426 to which a suitable supply voltage is applied. The relays 424 and 425 are connected between ground and terminals 427 and 428 connected to the program circuit. Thus upon application of a signal to terminal 427 to energize the relay 424, the contact 422 is closed to energize the motor 418 in one direction and thereby adjust the position of the contact of the potentiometer 415 to adjust the voltage on the line 391.

The motor terminal 420 is also connected through a normally closed contact 429 of a relay 430 to contacts 431 and 432 of a differential relay having coils 433 and 434 controlling a pair of movable contacts 435 and 436. Similarly, the terminal 421 of motor 418 is connected through the normally closed contact 437 of a relay 438 to contacts 439 and 440 of the differential relay. The contacts 435 and 436 of the differential relay are connected to terminals 441 and 442 which are respectively connected to the same and opposite lines 413 and 414 from the appraising and logic circuit 411.

Terminals of the coils of relays 430 and 438 are connected together and to one terminal 443 of the comparator circuit 444 with the other terminals of the coils of the relays 430 and 438 being connected to terminals 445 and 446 of the comparator circuit 444. The comparator circuit has one input terminal 447 connected through an amplifier 448 to the output line 391 and a second input terminal 449 connected through an amplifier 450 to an input terminal 451. Terminals of the differential relay coils 433 and 434 are connected together and to one terminal 452 of a comparator circuit 453 with the other terminals of the coils 433 and 434 being connected to terminals 454 and 455 of the comparator circuit 453. Comparator circuit 453 has one input terminal 456 connected through the amplifier 450 to the input terminal 451 and a second input terminal 457 connected through an amplifier 458 to an input terminal 459.

Input terminal 451 is connected to an output of the multi-channel amplifier 50 to receive a signal equal to the value of the purchased pulp consistency signal on line 93 connected to the output line 391 at some earlier time. Input terminal 459 is connected to an output of the multi-channel amplifier 54 to receive a signal equal to the value purchased pulp consistency signal at a still earlier time. Thus the input to the line 451 may be referred to as the latest recorded value of purchased pulp consistency while the input of line 459 may be referred to as the earlier recorded value of purchased pulp consistency. The signal on the output line 391 represents, of course, the present value of purchased pulp consistency.

In explaining the operation of the circuit of FIGURE 7, it may be assumed that the appraising and logic circuit 411 determines that there has been improvement in overall performance and that a signal is developed on the same line 413 connected to input terminal 441 of the circuit 401 and to the movable contact 435 of the differential relay. If at this time the latest recorded value of purchased pulp consistency, on line 451, is greater than the earlier recorded value, on line 459, the comparator circuit 453 energizes the coil 433 of the differential relay to engage contact 435 with contact 431 and to thereby apply a signal to the terminal 420 of the motor 418. The motor 418 then operates the contact of the potentiometer 415 in a direction to increase the voltage on the output line 391. When this voltage exceeds the latest recorded value of the purchased pulp consistency signal at input terminal 451 by a certain amount, the comparator circuit 444 energizes the relay 430 to open the contact 429 thereof and deenergize a motor 418.

Similarly, if a signal is applied on the same line 413 to be applied to the movable contact 435 of the differential relay and if the latest recorded value of purchased pulp consistency is less than the earlier recorded value, the comparator circuit 453 will energize the coil 434 of the differential relay to engage contact 435 with contact 439 and to thereby apply a signal to the terminal 421 of the motor 418, which will then hold the contact of the potentiometer 415 in a direction to decrease the output voltage on line 391. Then after the output voltage is decreased by a certain amount in comparison to the latest recorded value of purchased pulp consistency, the comparator 444 will energize the relay 438 to open the contact 437 and deenergize the motor.

It will be appreciated that a similar type of operation takes place when the appraising and logic circuit 411 applies a signal on the opposite line 414 on which signal is applied from the movable contact 436 of the differential relay to energize the motor 418 in one direction or the other.

It is noted that the comparator circuit 444 in conjunction with the relays 430 and 438 functions to limit the amount of increase or decrease of the output voltage with respect to the latest recorded value of the corresponding signal. It also insures against further increases or decreases in the output voltage in the event that changes have been previously introduced manually or by the program circuit 412.

FIGURE 8 is a schematic diagram of the appraising and logic circuit 411 which receives the latest recorded signals from the multi-channel amplifier 50 and the earlier recorded signals from the multi-channel amplifier 54, corresponding to the output of the profit rate computer 51 into the performance value signals from the gloss sensor 251, the moisture sensor 254, the basis weight sensor 257 and the caliper sensor 260. The circuit 411 compares such latest and earlier recorded signals with each other and with reference signals of preset amplitudes and performs operations which may be summarized as follows:

(1) If the latest and earlier recorded performance value signals are within desired limits and if the latest profit rate signal is greater than the earlier profit rate signal, then a signal is developed on the "same" output line 413. If, however, the latest recorded profit rate signal is less than the earlier recorded profit rate signal, then a signal is developed on the "opposite" output line 414.

(2) If one or more of the latest recorded performance value signals are beyond the desired limits, while the earlier recorded performance value signals are within desired limits, a signal is developed on the "opposite" output line 414 regardless of whether the latest recorded profit rate signal is greater than the earlier recorded profit rate signal.

(3) If one or more of the earlier recorded performance value signals are beyond desired limits, but the latest recorded performance value signals are within desired limits, no signal is developed on either of the output lines 413 or 414.

(4) If most earlier and latest recorded performance value signals are beyond desired limits, but the total deviation of the latest recorded performance value signals from desired values is greater than the total deviation of earlier recorded performance value signals from such values, a signal is developed on the "opposite" line 414. On the other hand, if the the total deviation from the earlier recorded performance value signals to the latest recorded performance value signals is decreased, a signal is developed on the "same" output line 413.

(5) If the latest and earlier recorded performance value signals are within desired limits and the latest and earlier recorded profit rate signals are the same, no signal is developed on either of the output lines 413 or 414. However, change in certain variables may be arbitrarily made by the program circuit 412 to determine whether changes should be made in such variables. The same operation may take place if the latest and earlier recorded performance value signals are beyond limits while the total deviation from desired values remains the same.

In general the circuit 411 comprises comparator circuits and logical circuitry connected thereto to indicate whether (a) the latest recorded profit rate signal is greater or less than the earlier recorded profit rate signal, whether (b) the latest recorded performance value signals are within desired limits, and whether (c) the total deviation from desired limits of the latest recorded performance value signals is greater or less than that of the earlier recorded performance value signals.

To develop a signal which indicates whether the latest recorded profit rate signal is greater or less than the earlier recorded profit rate signal, a comparator circuit 460 is connected to the outputs of a pair of amplifiers 461 and 462 having inputs responsive to profit rate signals from channels of the amplifiers 50 and 54. The output of the comparator circuit 460 is applied to coils 463 and 464 of a differential relay 465 having a movable contact 466 movable upwardly to engage a contact 467 or downwardly to engage a contact 468, according to whether the latest recorded profit rate signal is greater or less than the earlier recorded profit rate signal.

To develop a signal which indicates whether the latest recorded performance value signals meet the desired standards, four comparator circuits 471, 472, 473 and 474 are connected to the outputs of amplifiers 475, 476, 477 and 478 and also to four potentiometers 479, 480, 481 and 482, connected between ground and a terminal 483 which is connected to a suitable reference voltage source. The inputs of amplifiers 475–478 respond to the latest recorded signals corresponding to the outputs from the gloss sensor 251, the moisture sensor 254, the basis weight sensor 257, and the caliper sensor 260, while the potentiometers 479–482 are set manually according to desired performance values.

The outputs of the comparators circuits 471–474 are applied to relays 485–488 having normally opened contacts connected between a terminal 489 and a line 490, terminal 489 being also connected to the contact 466 of the differential relay 465. The DC signal is applied to the terminal 489 at predetermined times or continuously to cause operation of the controller circuitry. The contacts of the relays 485–488 are closed when the latest recorded performance value signals differ by a certain amount from desired values, as set by the potentiometers 479–482.

To develop a signal indicating whether the overall difference between desired values and the latest recorded performance value signals is greater or less than the total difference between the desired values and the earlier recorded performance value signals, output signals from the comparator circuits 471–474 are applied through isolation amplifiers 491–494 to diode-capacitor rectifier circuits connected in series, a DC signal being thereby developed which indicates the total deviation from desired values of the latest recorded performance value signals. The DC signal so developed is applied to a comparator circuit 495.

In addition, comparator circuits 497, 498, 499 and 500 are connected to the outputs of amplifiers 501, 502, 503 and 504, having inputs responsive to the earlier recorded performance value signals corresponding to the outputs of the gloss sensor circuit 251, the moisture sensor circuit 254, the basis weight sensor circuit 257 and the caliper sensor circuit 260. The comparator circuits 497–500 also have inputs connected to the potentiometers 479–482. The outputs of the comparator circuits 497–500 are applied through isolation amplifiers 505–508 to diode-capacitor rectifier circuits which are connected in series and to a second input of the comparator circuit 495.

Comparator circuit 495 has an output connected to coils 511 and 512 of a differential relay 513 having a movable contact 514 connected to the terminal 489 and movable upwardly to engage a contact 515 or downwardly to engage a contact 516, according to whether the total deviation with respect to the latest recorded signals is greater or less than the total deviation with respect to the earlier recorded signals.

The circuit 411 includes logical circuitry in the form of AND/OR gates and inverter circuits, and such circuitry may be best described with reference to the various possible conditions of operation as follows:

(1) If both the latest and earlier recorded performance value signals are within desired limits, the contacts of relays 485–488 and the contact 514 of relay 513 will be open and with the absence of a signal on the line 490, a signal is developed at the output of an inverter 520 to enable AND gate 521. If the latest recorded profit rate signal is greater than the earlier recorded profit rate signal, the contact 466 is moved upwardly to engage the contact 467 and apply a signal from the terminal 489 through the AND gate 521 to the "same" line 413. If, however, the latest recorded profit rate signal is less than the earlier recorded profit rate signal, the contact 466 is moved downwardly to engage the contact 468 and to apply a signal from the terminal 489 through an AND gate 522 to the output "opposite" line 414, the AND gate 522 being enabled by the signal applied from the inverter 520.

(2) If the earlier recorded performance value signals are within desired limits, but one or more of the latest recorded performance value signals are beyond desired limits, the contact 514 is moved upwardly to engage the contact 515 and to enable a gate 523, a signal being then applied from the line 490 through the gate 523 to the "opposite" line 414.

(3) If one or more of the earlier recorded performance value signals are beyond limits, but the latest recorded performance value signals are within limits, the contact 514 is moved upwardly to enable the gate 523, but with no signal applied on the line 490, no signal will be applied to the "opposite" line 413.

(4) If both the earlier and latest recorded performance value signals are beyond desired limits and the total deviation of the latest recorded signals is greater than the earlier recorded signals, the contact 514 is moved upwardly to enable the gate 523 and a signal is applied from the line 490 through the gate 523 to the "opposite" line 414. If, however, the total deviation of the latest recorded signals is less than the total deviation of the earlier recorded signals, the contact 514 is moved downwardly to engage the contact 516 to enable a gate 524 and a signal is applied from the line 490 through the gate 524 to the "same" line 413.

(5) The operation of the machine may become stabilized, with no output signal being developed on either of the lines 413 and 414. Under such conditions, the program circuit 412 may be operated to automatically introduce changes in certain variables, and to initiate operation of the program circuit, a signal may be applied thereto from the appraising and logic circuit 411, through an output line 525. Line 525 is connected to an integrate or time delay circuit 526, requiring application of an input signal thereto for a certain time interval, before developing an output signal on the line 525. When the latest and earlier recorded profit rate signals are the same and when the performance value signals are within the selected limits, no signal is developed at the output of an OR gate 527 connected to contacts 467 and 468 and to the line 490, and a signal is developed at the output of an inverter 528 which is applied through an OR gate 529 to the integrate circuit 526. When such conditions exist for a certain length of time, depending upon the operation of the integrating circuit 526, a signal of a certain amplitude is developed on the output line 525. In addition, when the performance value signals lie outside desired limits but without any difference in total deviation, no signal is applied through an OR gate 530 and an output signal from an inverter 531 is applied through an AND gate 532 and through the OR gate 529 to the integrate circuit 526, and the AND gate 532 being enabled by a signal on line 490.

Shown in FIGURE 9, the program circuit 412 has ten output terminals 541–550 which are connected to "increase" inputs of the control circuits 401–410, and ten terminals 551–560 connected to "decrease" inputs of the control circuits 401–410. For example, terminals 541 and 551 are respectfully connected to input terminals 427 and 428 of the control circuit 401 shown in FIGURE 7. Terminals 541–560 are selectively connected in any desired fashion to terminals 561–566, connected to terminals of a step switch 567 having a movable contact 568. The interconnection between terminals 541–560 and the terminals 561–566 may be made in any desired fashion, patch cords or the like being suitable, such that the interconnection therebetween may be changed as desired.

As illustrated, the contact 568 is connected to terminal 561 which is connected to terminals 541, 544, 547, and 550, and increase signals would be applied to the purchase pulp consistency, freeness, suction box vacuum and moisture differential circuits. When the contact 568 is moved to a second position to be connected to terminal 562, it would then be connected to terminals 542, 547, and 548 to apply increase signals to the broke pulp consistency, stock-wire speed ratio and couch vacuum control circuits. The other connections between terminals 561–566 and terminals 541–560 will be obvious from inspection of FIGURE 9, it being understood that such interconnections may be changed as desired.

The contact 568 of the step switch 567 is moved from one position to another by means of a switch operator 569 which has an input connected to a selector switch 570, to be controlled in one of three ways. As shown, selector switch 570 connects the input of switch operator 569 to the output line 525 from the appraising and logic circuit 441. In a second position of the selector switch 570, the input to the switch operator 569 is connected through a push button 571 to a terminal 572, to which a suitable voltage may be supplied, so that the switch operator 569 may be manually controlled by operation of the push button 571. In a third position of the selector switch 570, the input to the switch operator 569 is connected to a timer 573 which supplies a control signal at predeterminated time intervals.

A series of twenty push buttons 574 are also provided for applying an increase or decrease signal to any selected one of the control circuits, the push buttons 574 being connected between the terminals 541–560 and a terminal 575 to which a suitable voltage is applied. Terminal 575 is also connected to the movable contact 568 of the step switch 567.

The program circuit 412 permits a great deal of flexibility in applying change signals to the various control circuits.

It is noted that although the illustrated system records and performs analog multiplying operations on the various sensed signals, without conversion to digital signals, it is also possible to convert the sensed signals to digital signals which may be recorded or stored and later read-out from storage to produce signals properly correlated to the product produced by the system at a particular time, using the same principle of operation as utilized in the illustrated system. The multiplying operations can then be performed digitally.

It will be understood that other modifications and variations may be effected without departing from the spirit and scope of the novel concepts of this invention.

The invention claimed is:

1. An automatic machine system for a machine having a plurality of sections comprising (a) means for detecting and recording values of a plurality of variables in said machine sections, (b) means for controlling said plurality of variables, (c) a computer connected to receive inputs from said means for detecting and recording and connected to supply an input to said means for detecting and recording, (d) a comparison and logic control receiving inputs from said means for detecting and recording and connected to supply inputs to said means for controlling said variables, and (e) a storage means connected to receive inputs from said means for detecting and recording and connected to supply outputs to said comparison and logic control.

2. An automatic system according to claim 1 wherein said detecting and recording means includes magnetic tape means and read-in and read-out magnetic heads.

3. An automatic machine system according to claim 1 comprising performance value means connected to supply inputs to said storage means.

4. An automatic machine system according to claim 1 comprising means for recording the performance of said machine system connected to said storage means.

5. An automatic machine system having a plurality of closed loop servo systems comprising, (a) means for detecting and recording values of a plurality of variables in said machine, (b) a computer connected to receive inputs from said means for detecting and recording, (c) a comparison and logic control receiving inputs from said means for detecting and recording, (d) means for controlling said variable forming parts of said closed loop servo systems and receiving inputs from said comparison and logic control, (e) a storage means connected to receive inputs from said means for detecting and recording and supplying outputs to said comparison and logic circuit, and (f) means for supplying performance values to said storage means such that the values of said variable may be made optimum.

6. In an automatic paper making machine, a system for optimizing the consistency of pulp comprising, means for sensing the consistency of pulp in the machine, means for adding fluid to the pulp in the machine to change the consistency, means for detecting and recording values of consistency connected to said sensing means, a comparison and logic control receiving inputs from said detecting and recording means and connected to supply inputs to said means for adding fluid, a storage means connected to receive inputs from said detecting and recording means and supplying inputs to said comparison and logic circuit and means for supplying performance value to said storage means.

7. In an automatic paper making machine, a system for optimizing the freeness of pulp in the machine comprising, means for sensing the freeness of pulp in said machine, a refiner which has a plug of variable positions, means for varying the position of said plug to change the freeness of the pulp, means for detecting and recording values of freeness of said pulp connected to said sensing means, a comparison and logic circuit receiving inputs from said detecting and recording means and connected to supply inputs to said means for varying the position of the plug, a storage means connected to receive inputs from said detecting and recording means and supplying inputs to said comparison and logic circuit, and means for supplying performance values to said storage means.

8. In an automatic paper making machine having a slice and a movable wire, a system for optimizing the position of the slice member comprising, means for sensing the speed of said wire and the pulp pressure in the machine, means for controlling the slice member of the machine, means for detecting and recording values of the position of said slice member connected to said sensing means, a comparison and logic control receiving inputs from said detecting and recording means and connected to supply inputs to said controlling means, a storage means connected to receive inputs from said detecting and recording means and supplying inputs to said comparison and logic circuit, and means for supplying performance value to said storage means.

9. In an automatic paper making machine having a vacuum box, a system for optimizing the pressure in said vacuum box comprising, means for sensing the pressure in said vacuum box, means for controlling the pressure in said vacuum box, means for detecting and recording values of the pressure in said vacuum box connected to said sensing means, a comparison and logic control receiving inputs from said detecting and recording means and connected to supply inputs to said controlling means, a storage means connected to receive inputs from said detecting and recording means and supplying inputs to said comparison and logic circuit, and means for supplying performance values to said storage means.

10. In an automatic paper making machine, a system for controlling the pressure between rolls comprising, means for sensing pressure between rolls in the machine, means for controlling the pressure between rolls in the machine, means for detecting and recording values of the pressure between the rolls connected to said sensing means, a comparison and logic control receiving inputs from said detecting and recording means and connected to supply inputs to said control means, a storage means connected to receive inputs from said detecting and recording means and supplying inputs to said comparison and logic circuit, and means for supplying performance values to said storage means.

11. In an automatic paper making machine, a system for controlling the drive shaft of the machine comprising, means for sensing the speed of the drive shaft in the machine, means for controlling the speed of the drive shaft of the machine, means for detecting and recording values of the speed of the drive shaft connected to said sensing means, a comparison and logic control receiving inputs from said detecting and recording means and connected to supply inputs to said control means, a storage means connected to receive inputs from said detecting and recording means and supplying inputs to said comparison and logic circuit, and means for supplying performance values to said storage means.

12. In an automatic paper making machine, a system for controlling the drying section comprising, means for sensing the moisture content of paper in the drying section of the machine, means for adding fluid to the drying section in the machine to change the moisture content, means for detecting and recording values of moisture content connected to said sensing means, a comparison and logic control receiving inputs from said detecting and recording means and connected to supply inputs to said means for adding fluid, a storage means connected to receive inputs from said detecting and recording means and supplying inputs to said comparison and logic circuit, and means for supplying performance values to said storage means.

References Cited

UNITED STATES PATENTS

| | | | |
|---|---|---|---|
| 2,922,475 | 1/1960 | Alexander | 162—252 |
| 2,972,446 | 2/1960 | White | 235—252 |
| 3,016,460 | 1/1962 | Andresen | 235—151.32 |
| 3,044,701 | 7/1962 | Kerstukos et al. | 235—150.1 |
| 3,048,331 | 8/1962 | Van Nice et al. | 235—151 |
| 3,260,838 | 7/1966 | Andresen | 235—151.13 |

MALCOLM A. MORRISON, Primary Examiner

E. J. WISE, Assistant Examiner

U.S. Cl. X.R.

162—252; 235—151.12, 151.34

UNITED STATES PATENT OFFICE
CERTIFICATE OF CORRECTION

Patent No. 3,490,689          Dated January 20, 1970

Inventor(s) Robert H. Hart, Edward D. Beachler, Dirk J. Veneman Edgar J. Justus

It is certified that error appears in the above-identified patent and that said Letters Patent are hereby corrected as shown below:

Column 1, line 48, "Reasearch" should read --Research--.
Column 2, line 54, "statitstical" should read --statistical--.
Column 3, line 26, before "profit" insert --"--.
Column 4, line 57, "plup" should read --pulp--.
Column 5, line 65, after "control" insert --circuit 52. The circuit 52 develops output signals which are applied--.
Column 10, line 71, after "the" insert --wound--.
Column 13, line 64, "tap" should read --tape--.
Column 19, line 54, after "recording" insert --and connected to supply inputs to said means for detecting and recording

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents